United States Patent
Gaucher et al.

(10) Patent No.: US 7,230,571 B2
(45) Date of Patent: Jun. 12, 2007

(54) QUADBAND ANTENNA FOR PORTABLE DEVICES

(75) Inventors: Brian P. Gaucher, Brookfield, CT (US); Duixian Liu, Yorktown Heights, NY (US)

(73) Assignee: Lenova (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/967,407

(22) Filed: Oct. 18, 2004

(65) Prior Publication Data

US 2006/0082503 A1 Apr. 20, 2006

(51) Int. Cl.
*H01Q 1/38* (2006.01)
(52) U.S. Cl. .............................. 343/700 MS; 343/702
(58) Field of Classification Search ......... 343/700 MS, 343/702, 846
See application file for complete search history.

(56) References Cited

U.S. PATENT DOCUMENTS

2002/0175861 A1* 11/2002 Lin .................... 343/700 MS
2004/0056805 A1* 3/2004 Chen .................... 343/700 MS
2004/0246179 A1* 12/2004 Chen et al. .......... 343/700 MS
2005/0062651 A1* 3/2005 Dai et al. ............ 343/700 MS

* cited by examiner

*Primary Examiner*—Hoang V. Nguyen
(74) *Attorney, Agent, or Firm*—William N. Hogg; Driggs, Hogg & Fry Co., LPA (57) ABSTRACT

A compact sized integrated quadband antenna for portable devices used in wireless applications is provided to provide wireless wide area network quadband coverage for world wide applications. The antenna design includes a combination of F-shaped and variations of L-shaped metal pieces. The F-shaped and variations of L-shaped metal pieces are provided on a double-sided printed circuit board. The F-shaped metal piece covers 800 MHz and 900 MHz bands. Two variations of L-shaped metal pieces are provided, whereby the two variations produce two resonants in the 1800 MHz and 1900 MHz bands. The two variations of L-shaped metal pieces are provided inside the F-shaped metal piece. The laptop display frame or the metal display supporters are used as part of the antenna, the display frame or the metal display supporters providing the ground plane to the antenna design.

18 Claims, 8 Drawing Sheets

QUADBAND ANTENNA FOR PORTABLE DEVICES

TECHNICAL FIELD OF THE INVENTION

The present invention relates generally to integrated antennas for portable devices used in wireless applications, and more specifically, to quadband antennas that may be embedded in portable devices such as laptop computers and cellular phones, for example, to provide efficient wireless communication in multiple frequency bands.

BACKGROUND

In wireless communication, antennas may be used to provide wireless connectivity between a portable device, such as a laptop computer, and other portable devices, peripherals, or communication devices. In a portable laptop computer, the antenna may be located either external to the computer or integrated within the computer.

Figure 1:
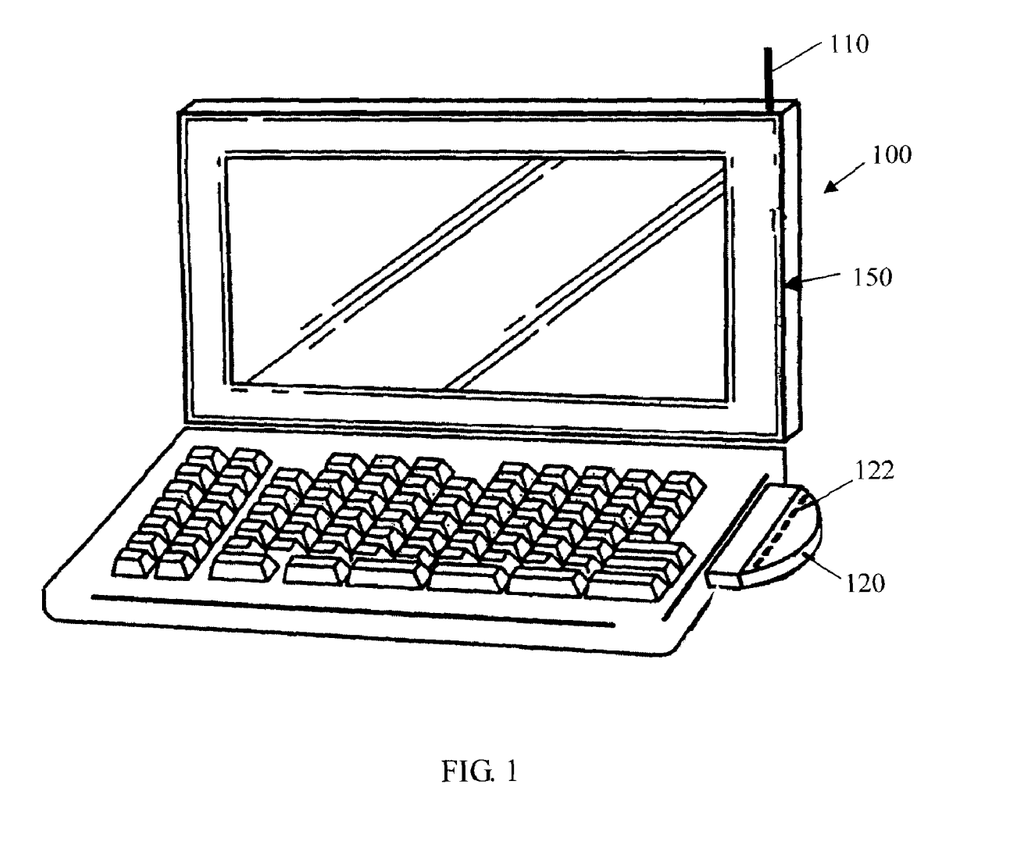
FIG. 1 is a diagram illustrating various conventional embodiments of external antennas for a laptop computer.

FIG. 1 illustrates an exemplary embodiment of a laptop computer which includes an antenna located external to the computer. In the exemplary embodiment of FIG. 1, the laptop computer 100 includes a monopole-like antenna 110 or 122. As shown in FIG. 1, the monopole-like antenna 110 may be located at the top of a display unit 150 of the laptop computer 100. Alternatively, the monopole-like antenna 122 may be located on a PC card 120.

Figure 2:
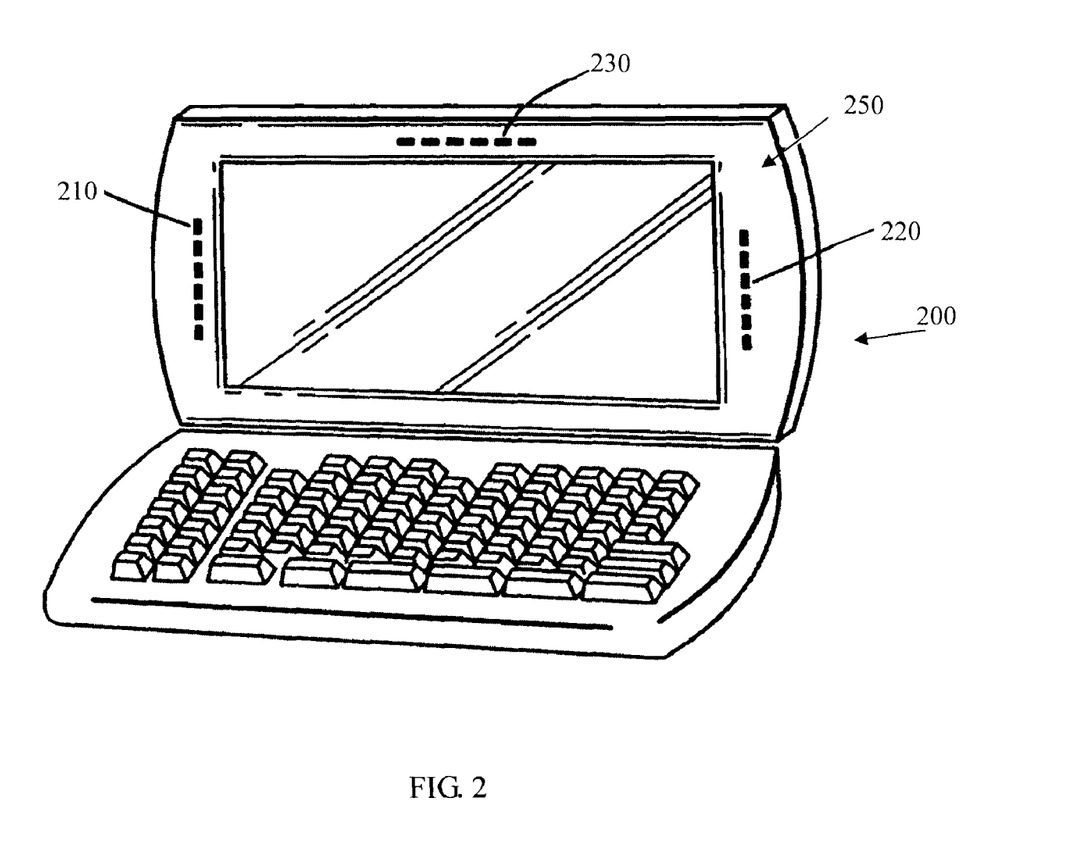
FIG. 2 is a diagram illustrating various conventional embodiments of embedded antennas for a laptop computer.

FIG. 2 illustrates another exemplary embodiment of a laptop computer which includes onr or more antennas integrally built, or embedded, within the computer. As shown in FIG. 2, the laptop computer 200 includes one or more antennas 210, 220, 230, such as whip-like or slot embedded antennas, embedded in a laptop display 250. In one exemplary embodiment, two embedded antennas 210, 220 may be placed on the left and right edges of the laptop display 250, respectively, whereby the use of the two antennas 210 and 220 may reduce the blockage caused by the laptop display 250 in some directions that occurs in one antenna designs, and provide space diversity to the wireless communication system. Alternatively, one of the antennas 210 or 220 may be disposed on one side of the laptop display 250 while a second antenna 230 is disposed in an upper portion of the laptop display 250, whereby providing antenna polarization diversity, depending on the antenna design used.

SUMMARY OF THE INVENTION

In accordance with the various exemplary embodiments of this invention, a compact sized integrated quadband antenna for portable devices used in wireless applications is provided to provide wireless wide area network quadband coverage for world wide applications.

More specifically, these exemplary embodiments of this invention include quadband antennas that may be embedded in portable devices such as laptop computers and cellular phones, for example, to provide efficient wireless communication.

In accordance with the various exemplary embodiments of this invention, the antenna design includes a first radiating element, a second radiating element and a third radiating element.

In accordance with these various exemplary embodiments, the first, second and third radiating elements are provided on a double-sided printed circuit board.

In accordance with these various exemplary embodiments, the first radiating element is an F-shaped metal piece and the second radiating element and the third radiating element are variations of L-shaped metal pieces.

In accordance with these various exemplary embodiments, the first radiating element covers 800 MHz and 900 MHz bands.

In accordance with these various exemplary embodiments of this invention, the second and third radiating elements produce two resonants in the 1800 MHz and 1900 MHz bands.

In accordance with various exemplary embodiment of this invention, the second and third radiating elements are provided inside the first radiating element.

In accordance with various exemplary embodiments of the present invention, the laptop display frame or the metal display supporters are used as part of the antenna.

In accordance with these various exemplary embodiments, the display frame or the metal display supporters provide the ground plane to the antenna design.

These and other exemplary embodiments, objects, embodiments, features and advantages of this invention will be described or become apparent from the following detailed description of preferred embodiments, which is to be read in connection with the accompanying drawings.

DETAILED DESCRIPTION OF EXEMPLARY EMBODIMENTS

In recent developments, embedded antennas may be used, for example, with portable computers, wherein the antennas are mounted on a metallic support frame or rim of a display device, such as the liquid crystal display (LCD) panel, or other internal metal support structure, as well as antennas that may be integrally formed on the shielding foil located on the back of the display unit. For example, U.S. Pat. No. 6,339,400, issued to Flint et al. on Jan. 15, 2002, entitled "Integrated Antenna For Laptop Applications", and U.S. patent application Ser. No. 09/876,557, filed on Jun. 7, 2001, entitled "Display Device, Computer Terminal and Antenna," which are commonly assigned and incorporated herein by reference, disclose various embedded single-band antenna designs for laptop computers, which may be implemented to operate in the 2.4 GHz ISM frequency band, for example. Furthermore, U.S. patent application Ser. No. 09/866,974, filed on May 29, 2001, entitled "An Integrated Antenna for Laptop Applications", and U.S. patent application Ser. No. 10/370,976, filed on Feb. 20, 2003, entitled "An integrated Dual-Band Antenna for Laptop Applications," both of which are commonly assigned and incorporated herein by reference, describe embedded dual-band antennas for laptop computers that may be implemented to operate in the 2.4 GHz ISM band and the 5.15-5.35 GHz ISM band, for example. In addition, U.S. patent application Ser. No. 10/318,816, filed on Dec. 13, 2002, entitled "An Integrated Tri-Band Antenna for Laptop Applications", which is commonly assigned and incorporated herein by reference, discloses various embedded tri-band antennas for laptop computers that may be implemented to operate in the 2.4-2.5 GHz, 5.15-5.35 GHz and 5.47-5.85 GHz bands, for example.

Figure 3:
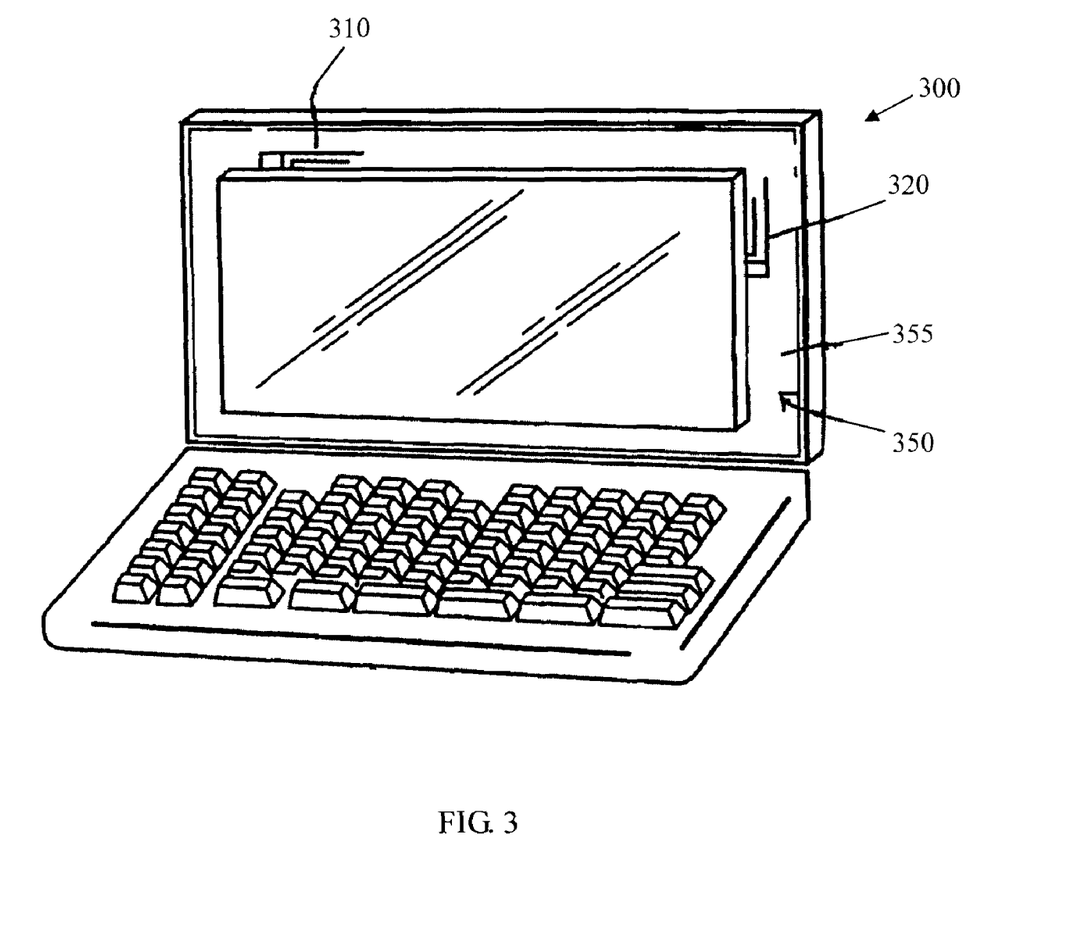
FIG. 3 is a schematic diagram illustrating a method for mounting embedded antennas on a laptop display unit.

FIG. 3 is a schematic diagram illustrating various orientations for mounting embedded antennas on a laptop display unit, as well as multiband antenna frameworks in accordance with the exemplary embodiments of this invention. For example, FIG. 3 shows a laptop computer 300 including a laptop display unit 350 and a plurality of multiband antennas 310, 320 mounted on the support frame 355 of the laptop display unit 350. As shown in FIG. 3, the pair of multiband antennas 310, 320 are mounted to the metal support frame 355, wherein the plane of each multiband antenna 310, 320 is substantially parallel to the plane, or along the plane, of the metal support frame 355.

In wireless network connectivity within buildings and hot spot locations, laptop computers may be equipped with integrated wireless local area network (WLAN) and devices of the known Bluetooth technology, incorporated as a cable replacement between portable and/or fixed electronic devices.

In recent developments where laptop computers are increasingly being used on the road and away from the hot spot locations, it is becoming increasingly important that this connectivity and mobility be maintained. Accordingly, it would be advantageous in wireless applications to increase the mobility of the laptop computers. One exemplary embodiment is the integration of wireless wide area network (WWAN) connectivity often used in cell phone connections on the road.

Because there are no standardized frequencies, wireless wide area network (WWAN) connectivity may be problematic for worldwide use. That is, each country has its own standard and frequency, making a single integrated antenna and radio may be extremely difficult.

In a wireless network, the lower the frequency, the larger the antenna structures that are required. Because recent developments focus on the space allocated for antennas working at 2.4 GHz and 5 GHz, extending the operating frequency from 2.4 GHz to 1800 MHz, for example, or worse, 800 MHz, requires even more space for antennas, thereby causing additional problems for laptop mechanical and industrial designs.

Exemplary embodiments of integrated multiband antenna frameworks according to this invention include extensions of the dual-band and tri-band integrated antenna designs described in the above-incorporated patent applications and patents. In accordace with the various exemplary embodiments of this invention, the design of a compact-sized quadband antenna covering the four most popular frequency bands, namely, 824-894 MHz for the lower band of the United States, 880-960 MHz for the lower band of Europe, 1710-1880 MHz for the upper band of Europe, and 1850-1990 MHz for the upper band of the United States is applied.

In accordance with these exemplary embodiments, the four frequency bands are combined to form two frequency bands: 824-960 MHz for the lower band with a 136 MHz bandwidth, and 1710-1990 MHz for the upper band with a 280 MHz bandwidth. That is, the quadband antenna is in fact also a dual band antenna.

These exemplary quadband antenna frameworks provide flexible and low cost designs that can be implemented for a variety of wireless applications. Quadband antennas with one feed provide advantages, such as saving very expensive radio frequency (RF) connectors and coaxial cables, over multi-fed antennas for cellular and wireless local area network (WLAN) applications.

Antennas may be designed by patterning one or more antenna elements on a printed circuit board, and then connecting the patterned printed circuit board to the metal support frame of the display panel, wherein the metal frame of the display unit is used as a ground plane for the antennas. A coaxial transmission line may be used to feed the embedded antenna, wherein the center conductor is connected to a radiating element of the antenna and the outer conductor shield is connected to the metal rim of the display unit. Advantageously, these embedded antenna designs support many antenna types, such as slot antennas, inverted-F antennas and notch antennas, and provide many advantages such as smaller antenna size, low manufacturing costs, compatibility with standard industrial laptop/display architectures, reliable performance and the like.

Figure 4:
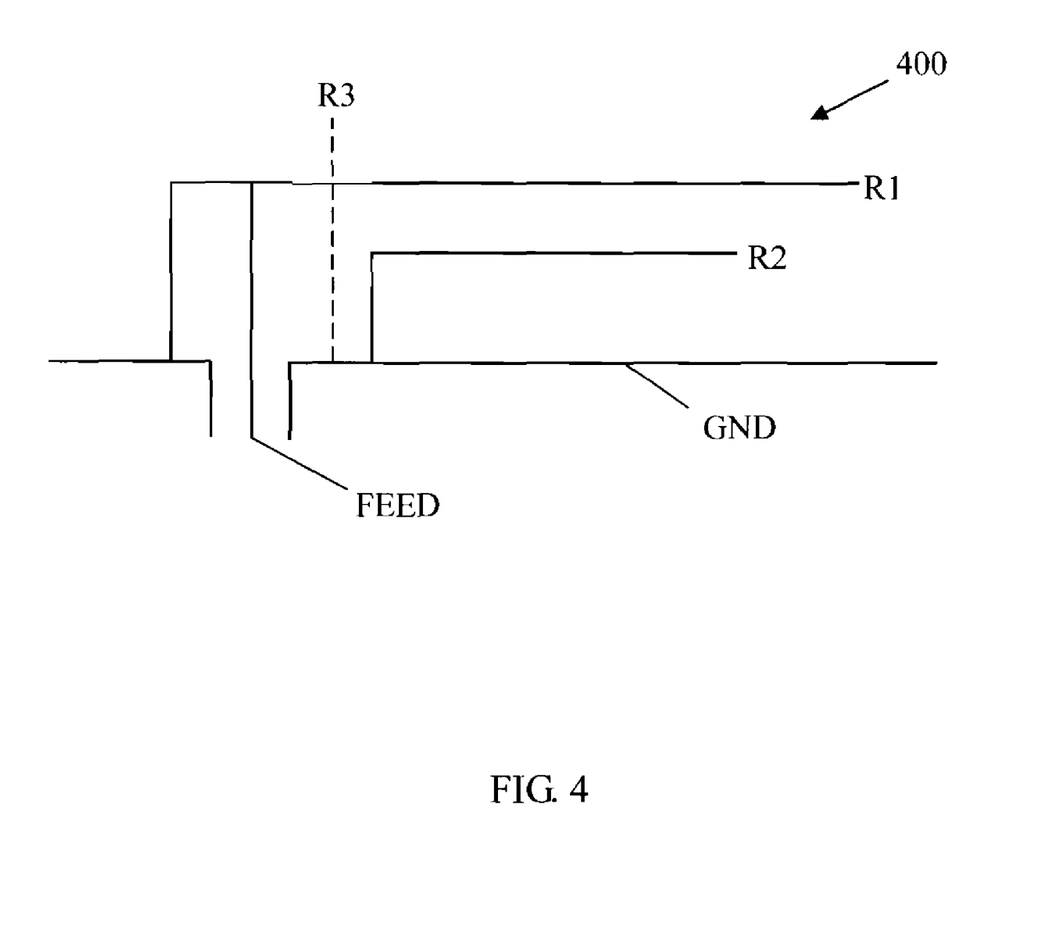
FIG. 4 schematically illustrates an exemplary multiband antenna according to various exemplary embodiments of this invention.

FIG. 4 is a schematic illustration of a multiband antenna framework such as a quadband antenna framework according to various exemplary embodiments of the invention. As shown in FIG. 4, the multiband antenna 400 includes a plurality of radiating elements R1, R2 and R3, a ground element GND, and a signal feed FEED, such as a center conductor of a coaxial transmission line.

As shown in FIG. 4, a first radiating element R1 is connected to the ground element GND, and thus, is grounded. Additionally, the first radiating element R1 is connected to the signal feed FEED.

Further, the first radiating element R1 is the longest radiating element and resonates at a first lowest frequency F1, and is approximately one-quarter wavelength in length at the first frequency F1 Essentially, the multiband antenna 400 behaves as a bent quarter wavelength monopole, or an inverted-F antenna, at the low band.

When designed to provide quadband operation, second and third radiating elements R2 and R3 resonate at different second and third frequencies F2 and F3, respectively, wherein the second and third frequencies F2 and F3 are each greater than the first frequency F1. The second radiating element R2 is connected to the ground element GND. In addition, the third radiating element R3 is also connected to the ground element GND.

In accordance with these exemplary embodiments, the multiband antenna 400 enables improved impedance matching to the standard industry impedance value, depending on the connection location of the signal feed FEED to the first radiating element R1.

In these exemplary embodiments, the first, second and third radiating elements R1, R2 and R3 are designed to have different resonance frequencies in separate, discreet bands, whereby the lengths of the first, second and third radiating elements R1, R2 and R3 primarily determine the resonant frequency. Similarly, the spacing between the first, second and third radiating elements R1, R2 and R3 determines the coupling, resulting in impedance matching.

It should be understood that though FIG. 4 depicts the multiband antenna 400 as having the second and third radiating elements R2 and R3 disposed on opposite sides of the first radiating element R1, other frameworks are possible according to the various exemplary embodiments of this invention.

As shown in FIG. 4, the first and second radiating elements R1 and R2 are bent to reduce antenna height and provide a more compact design. It should be appreciated that the third radiating element R3 may be bent, arranged, and/or connected in different ways to form many variations of the antenna structures. The architecture of the multiband antenna 400 is advantageously adapted for use with portable devices such as laptops due to the small, compact design of the multiband antenna 400, as well as the reliability of operation.

It should be appreciated that the framework of the multiband antenna 400 depicted in FIG. 4 is merely an exemplary embodiment, and that other structures may be readily envisioned by one of ordinary skill in the art based on the teachings herein. For example, in other exemplary embodiments, the multiband antenna 400 may include branch radiating elements connected to the first radiating element R1. Moreover, the multiband antenna 400 may include one or more branch elements connected to the first radiating element R1 and/or the signal feed FEED.

It should be understood that while the multiband antenna 400 is described as being implemented for quadband applications, the multiband antenna 400 may also be implemented for dual-band applications. In such dual-band applications, the first radiating element R1 may be designed for a first, low band, and the second and third radiating elements R2 and R3, for example, may be designed for providing a wide frequency span, wide bandwidth, for the second, high band.

In these exemplary embodiments, the multiband antenna provides the flexibility needed in wireless communication. Those of ordinary skill in the art will readily appreciate that the size, shape, and/or positioning of the various antenna elements will vary depending on, for example, the type of components used to construct the antennas such as the wires, planar metal strips, printed circuit board, and the like, the antenna environment, the available space for the antenna, and the relative frequency bands when used for different applications.

It is to be appreciated that depending on the application, a multiband antenna may be stamped from thin sheet metal or printed on a printed circuit board or made of thin metal wires, which are very suitable for portable applications like laptop computers and cell phones. In such exemplary embodiments, the multiband antenna including the first, second and third radiating elements R1, R2 and R3 may be implemented on a standard doublesided printed circuit board, with the frontside and backside of the antenna being connected when necessary. In these various exemplary embodiments, the third radiating element R3 may be implemented on the backside of the printed circuit board and ground elements on the frontside and the backside of the printed circuit board are connected, through plated through-holes, for example.

It should be appreciated that, for laptop applications, the laptop display frame or the metal display supporters may be used as part of the antenna, whereby the display frame or the metal display supporters provide the ground element to the antenna design. For example, the ground element may be provided by the display frame, or metal supports, or the shielding foil on the back of the display. In such cases, the multiband antenna may be disposed parallel or perpendicular to the display, depending on the industrial design requirements.

Figure 5A:
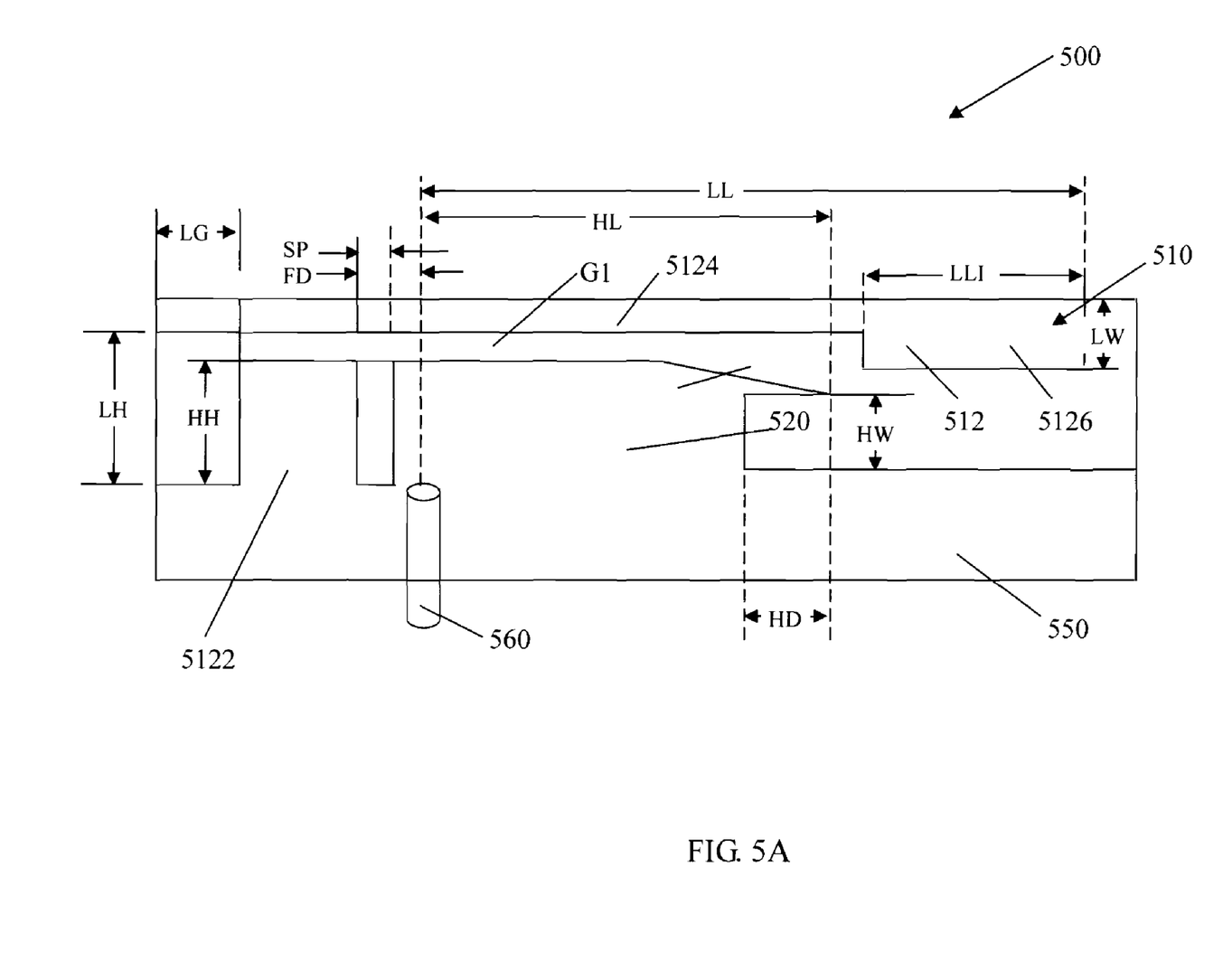
FIG. 5A schematically illustrates a front view of a quadband antenna according to an exemplary embodiment of this invention.
Figure 5B:
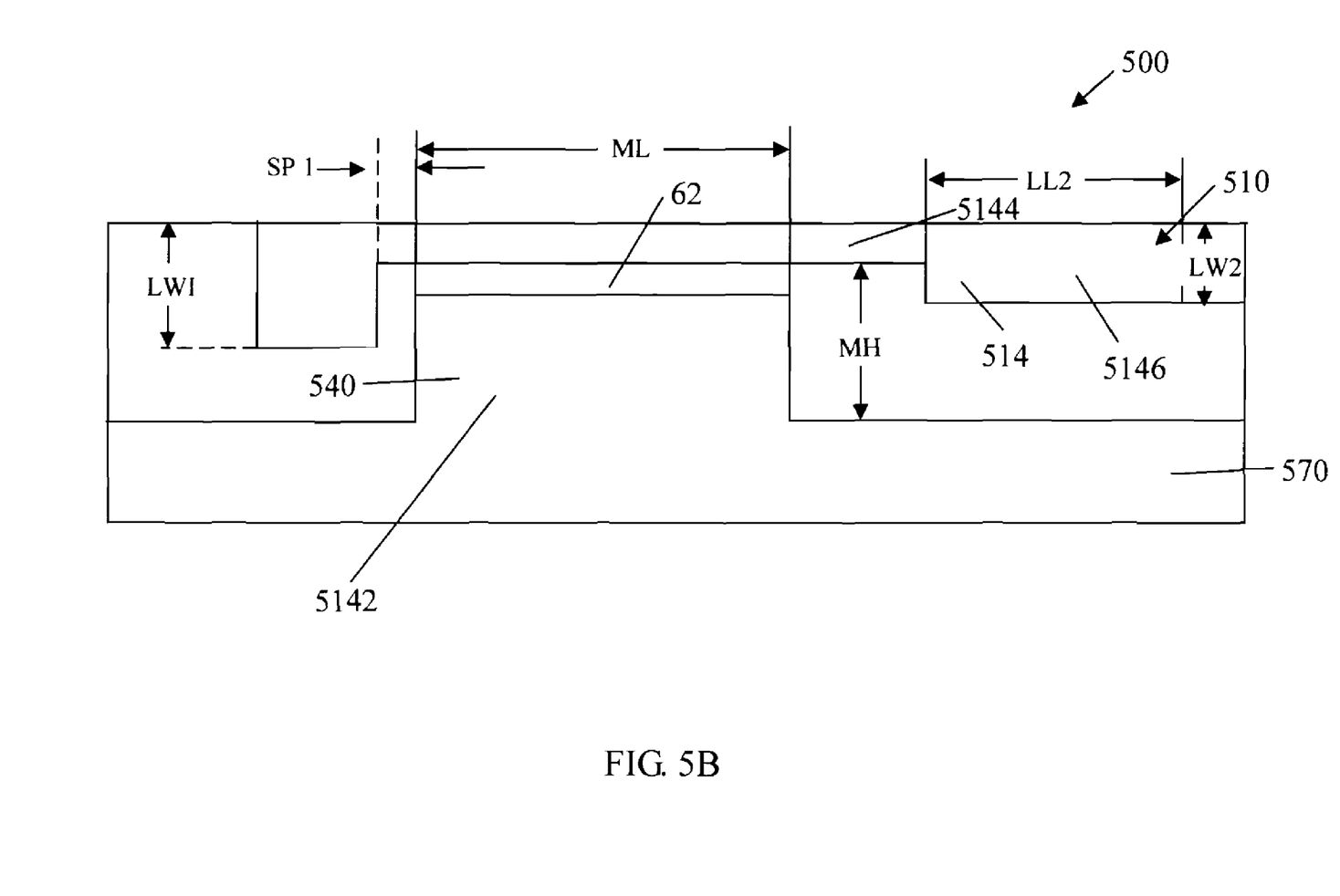
FIG. 5B schematically illustrates a back view of a quadband antenna according to an exemplary embodiment of this invention.

FIGS. 5A-B respectively show the front view and the back view detailing dimensions for a quadband antenna implemented on an antenna substrate in accordance with an exemplary embodiment of this invention. As shown in FIGS. 5A-B, the quadband antenna 500 includes a plurality of radiating elements 510, 520 and 540, whereby second and third radiating elements 520 and 540 are provided inside a first radiating 510. As shown in the figures, the first, second and third radiating elements 510, 520 and 540 are connected to a ground element 550, 570. Further, the first radiating element 510 is connected to a signal feed, or an inner conductor, 565 of the coaxial cable 560. In the exemplary embodiment shown in FIGS. 5A-B, the first radiating element 510 is an F-shaped metal piece and includes a front portion 512 and a back portion 514 respectively provided on the frontside and backside of the antenna substrate.

It should be appreciated that the front portion 512 and the back portion 514 of the first radiating element 510 are fully connected or partially connected. In one exemplary embodiment, the front portion 512 and the back portion 514 may be connected by a connection portion (not shown) provided on the top of the antenna substrate, whereby connecting the top of the two portions. In another exemplary embodiment, the front portion 512 and the back portion 514 may be connected through plated through-holes (not shown), whereby connecting the two portions through the antenna substrate. It should be appreciated that other methods of fully connecting or partially connecting the front portion 512 and the back portion 514 may be applied according to the various exemplary embodiments of this invention, and thus, this invention is in no way limited to the above-described exemplary embodiments.

Similarly, in accordance with the various exemplary embodiments of this invention, the ground elements 550 and 570 respectively on the frontside and the backside of the antenna substrate are connected, through plated through-holes, for example.

As shown in FIG. 5A, the front portion 512 of the first radiating element 510 includes a front stem portion 5122 connected to the ground element 550, a first protrusion portion 5124 protruding from the stem portion 5122, and a second protrusion portion 5126 protruding from the first protrusion portion 5124. The front portion 512 includes dimensions LH, LG, SP, FD, LL, LL1 and LW, wherein LH is the height of the front stem portion 5122, LG is the distance of the stem portion 5122 from the left edge of the quadband antenna 500, SP is the distance of the stem portion 5122 from the second radiating element 520, FD is the distance of the front stem portion 5122 from the signal feed 565, LL is the distance of the signal feed 565 to the edge of the first protrusion portion 5124, LL1 is the length of the second protrusion portion 5126, and LW is the width of the second protrusion portion 5126.

Since strong coupling exists among L-shaped metal pieces in a quadband antenna, in accordance with the various exemplary embodiments of this invention, providing variations or modifications of L-shaped metal pieces may affect the performance of quadband antenna, thus, giving more freedom for bandwidth optimization. Accordingly, in accordance with the various exemplary embodiments of this invention, the second and third radiating elements 520 and 540 are variations of L-shaped metal pieces.

As shown in FIG. 5A, the second radiating element 520 is provided in the frontside of the quadband antenna 500 and is connected to the ground element 550. In the exemplary embodiment shown in FIG. 5A, the second radiating element 520 is a variation of an L-shaped metal piece inverted inside the front portion 512 of the first radiating element 510, and includes a tapered protrusion 522. The second radiating element 520 includes dimensions, HH, HL, HW, HD, and G1, whereby HH is the height of the second radiating element 520, HL is the length of the second radiating element 520 including the tapered protrusion 522, HW is the height of the second radiating element 520 without the tapered protrusion 522, HD is the length of the tapered protrusion 522, and G1 is the distance between the first radiating element 510 and the second radiating element 520.

As shown in FIG. 5B, the third radiating element 540 is provided on the backside of the quadband antenna 500 and is connected to the ground element 570. In the exemplary embodiment shown in FIG. 5B, the third radiating element 540 is a variation of an L-shaped metal piece provided inside the back portion 514 of the first radiating element 510. The third radiating element 540 includes dimensions MH and ML, whereby MH is the height of the third radiating element 540, and ML is the length of the third radiating element 540.

As shown in FIG. 5B, the back portion 514 of the first radiating element 510 includes a back stem portion 5142, a first protrusion portion 5144 protruding from the back stem portion 5142, and a second protrusion portion 5146 protruding from the first protrusion portion 5144. The back portion 514 includes dimensions LW1, SP1, LL2, LW2, and G2, wherein LW1 is the height of the back stem portion 5142, SP 1 is the distance of the back stem portion 5142 from the third radiating element 540, LL2 is the length of the second protrusion portion 5146, LW2 is the width of the second protrusion portion 5146, and G2 is the distance between the third radiating element 540 and the first radiating element 510.

In accordance with the exemplary embodiment of FIGS. 5A-B, the first radiating element 510 covers the 800 MHz and 900 MHz bands, whereby the first radiating element 510 provides a multiband operation in two or more frequency bands. The second and third radiating elements 520 and 540 produce two resonants in the 1800 MHz and 1900 MHz bands.

In this exemplary embodiment, the quadband antenna 500 behaves as an inverted-F antenna for the lower band, whereby the dimensions of the quadband antenna 500 are adjusted for resonant frequency determination and impedance matching. That is, by adjusting the dimensions of the F-shaped first radiating element 510, a first resonant frequency F1 in the lower band may be determined and the impendance matching may be done.

As discussed above, in the various exemplary embodiments of this invention, the front portion 512 and the back portion 514 of the first radiating element 510 are connected, and thus, increasing the antenna volume, resulting in a lower quality factor (Q) value, and as a result, a wider antenna bandwidth. At the same time, in these exemplary embodiments, the antenna space is conserved for the quadband antenna 500.

The sum of height LH and length LL of the F-shaped first radiating element 510 may be used to determine the first frequency F1 in the lower band. Further, adjusting the distance FD from the signal feed 565 may also shift the first frequency F1, whereby reducing the distance FD may increase the first frequency F1 and increase the distance FD may reduce the first frequency F1, while keeping the feed point fixed. Additionally, the height LH and the dimensions of the protrusion portions 5124, 5126, 5144 and 5146 may also affect the first frequency F1, whereby increasing the height LH or the widths LW and LW2 may reduce the first frequency F1. Thus, the antenna length of the quadband antenna 500 may be reduced to increase the first frequency F1 to keep the first frequency F1 at a constant value.

The height LH and widths LW and LW2 also affect the impedance bandwidth, whereby increasing the height LH may increase the antenna bandwidth and the widths LW and LW2 may also be used to further improve the antenna bandwidth at the lower band. Further, the distance SP from the second radiating element 520 may be adjusted for the lower band impedance matching.

In this exemplary embodiment, two variations of L-shaped metal pieces are used for the upper band of the quadband antenna 500. Particularly, the second radiating element 520 produces second resonant frequency F2 and the third radiating element 540 produces third resonate frequency F3, where the third frequency F3 is less than the second frequency F2. Therefore, in this exemplary embodiment, there are two resonances in the upper band.

The second frequency F2 may be determined by the height HH of second radiating element 520, the sum of width HD and height HW of the protrusion portion 522, and the gap G1 between the second radiating element 520 and the horizontal element of the first radiating element 510. Increasing the sum of the width HD and height HW may reduce the second frequency F2. For the extreme case, if the sum equals zero, or no protrusion, the second radiating element 520 is similar to the third radiating element 540 in the backside of the quadband antenna 500. However, in such case, the second frequency F2 will be very high.

In this exemplary embodiment, increasing the height HH may reduce the second frequency F2. Reducing the gap G1 may increase the coupling between the second radiating element 520 and the first radiating element 510 and the load effect on the second radiating element 520 due to the horizontal element of the first radiating element 510, as a result, reducing the second frequency F2. The impedance at the second frequency F2 is also determined by the height HH and gap G1, as well as the width HL and the relative location distance SP. Since the second radiating element 520 is electrically coupled to the first radiating element 510 and the third radiating element 540, adjusting the first radiating element 510, the third radiating element 540, and the feed line distance FD may also affect the second frequency F2. The tapered portion on the second radiating element 520 may also improve the impedance bandwidth.

Similarly, the third resonant frequency F3 by the third radiating element 540 may be determined by the height MH of the third radiating elment 540 and the gap G2 between the third radiating element 540 and the first radiating element 510. Increasing the height MH may reduce the third resonant frequency F3 while reducing the gap G2 may increase the coupling between the third radiating element 540 and the first radiating element 510 and the load effect on the third radiating element 540 due to the horizontal element of the first radiating element 510, as a result, reducing the third frequency F3. This is similar to the case of the height HH and the gap G1 of the second radiating element 520 on the second frequency F2. The impedance at the third frequency F3 is also determined by the height MH and gap G2, as well as the width ML and the distance SP1. Since the third radiating element 540 is electrically coupled to the first radiating element 510 and the second radiating element 520, adjusting the first radiating element 510, the second radiating element 520 and the feed line location distance FD may also affect the third frequency F3.

It should be understood that though the exemplary embodiments above are described as having the second and third radiating elements R2 and R3 respectively determine the second and third frequencies F2 and F3, other frameworks are possible according to the various embodiments of this invention. That is, it should be understood that, in accordance with the various exemplary embodiments of this invention, the second radiating element R2 may determine the third frequency F3, and that the third radiating element R3 may determine the second frequency F2, depending on the application.

In accordance with this exemplary embodiment, adjusting the second and third frequencies F2 and F3 has negligible effect on the first frequency F1. Accordingly, the first frequency F1 is determined first, and then the parameters of the second and third radiating elements 520 and 540 are adjusted, to achieve the desired second and third frequencies F2 and F3.

In accordance with the various exemplary embodiments of this invention, to improve the antenna bandwidth at the lower band to provide enough frequency margin or to cover the cellular bands starting as low as 810 MHz in Japan, for example, the antenna volume is increased. In these exemplary embodiments, the antenna thickness is increased to increase the antenna volume. Due to industrial and system design constraints, increasing the antenna volume may be difficult. However, in accordance with the various exemplary embodiments of this invention, the antenna bandwidth at the lower band may be improved by optimizing the parameters LL1, LW, LW1, LL2 and LW2 of the first radiating element 510. Increasing these parameters of the first radiating element 510 may decrease the first frequency F1, and thus, the length LL is shortened to maintain the first frequency F1 to a constant value.

Exemplary experiments indicate that a very low standing wave ratio (SWR) value at the first frequency F1 results in a narrow standing wave ratio (SWR) bandwidth in this design. Thus, a wide bandwidth may be achieved by using a higher, within specification, standing wave ratio (SWR) value, for example 1.5, at the first frequency F1.

Similarly, the bandwidth at the upper band may also be improved. Since the second and third frequencies F2 and F3 exist in the upper band, in accordance with the exemplary embodiments of this invention, exemplary experiments show that separating the second and third frequencies F2 and F3 further apart results in a "w" shaped standing wave ratio (SWR) pattern. The maximum standing wave ratio (SWR) bandwidth may be achieved when the middle peak of the "w" shaped pattern reaches the maximum standing wave ration (SWR) value specification, in the operating band of interest. The bandwidth may also be improved by changing the location distances SP and SP1, gaps G1 and G2, widths HL and ML of the third and second radiating elements 540 and 520, respectively. For the second radiating element 520, adjusting the width HW may affect the bandwidth and matching while keeping the sum of the widths HW and HD fixed to maintain a constant value for the third frequency F3. The tapered portion in the second radiating element 520 may affect the third frequency F3 and matching, resulting in affecting the bandwidth.

In accordance with the various exemplary embodiments of this invention, providing variations of L-shaped metal pieces may affect the performance of the quadband antenna, thus, giving more freedom for bandwidth optimization.

Figure 6A:
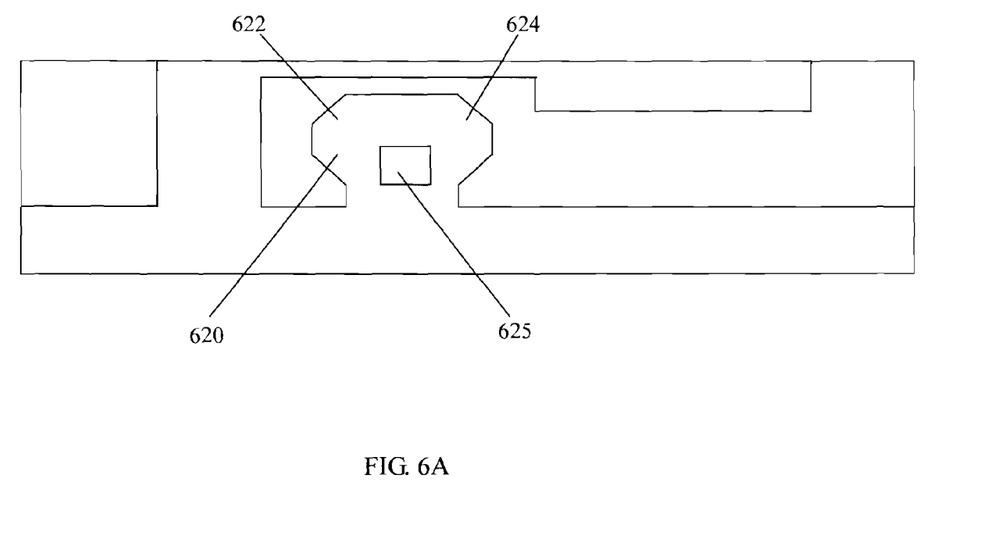
FIG. 6A schematically illustrates a front view of a quadband antenna according to another exemplary embodiment of this invention.
Figure 6B:
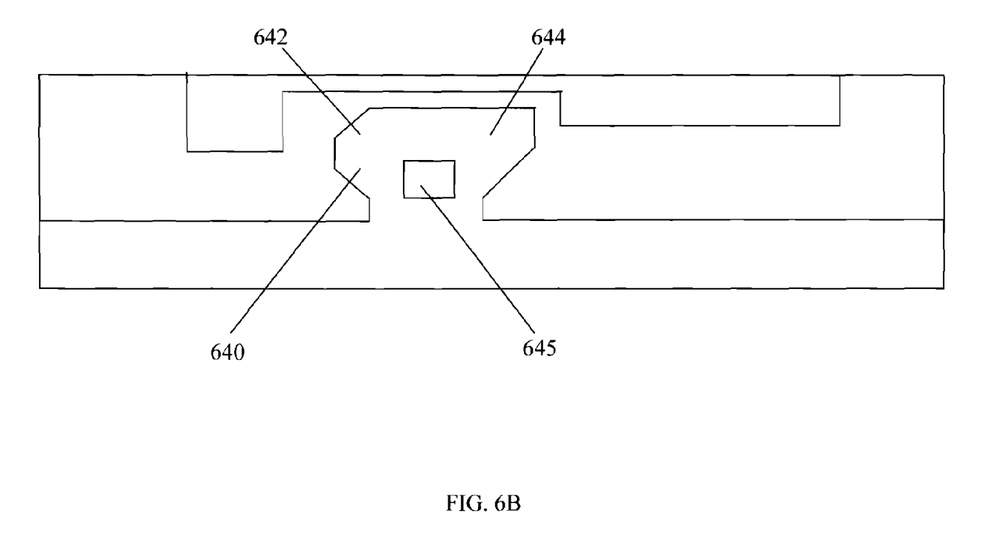
FIG. 6B schematically illustrates a back view of a quadband antenna according to yet another exemplary embodiment of this invention.

FIGS. 6A-B show various exemplary modification of the shapes of the L-shaped metal pieces. As shown in FIG. 6A, the L-shaped metal piece 620 is a modified version of the L-shaped second radiating element 520 of FIG. 5A. Similarly, as shown in FIG. 6B, the L-shaped metal piece 640 is a modified version of the L-shaped third radiating element 540 of FIG. 5B.

As shown in FIG. 6A, the L-shaped metal piece 620 includes notch portions 622 and 624 on the left and right side that respectively include tapered portions on both top and bottom portions. The L-shaped metal piece 620 further includes a window portion 625 in the center of the L-shaped metal piece 620.

As shown in FIG. 6B, the L-shaped metal piece 640 includes notch portions 642 and 644 on the left and right side that respectively include tapered portions on the bottom portions of the notch portions 642 and 644, and a tapered portion on one of the top portions of the notch portions 642 or 644. The L-shaped metal piece 640 further includes a window portion 645 in the center of the L-shaped metal piece 640. It should be appreciated that the tapered top portion of the L-shaped metal piece 640 may be in the left side or the right side, in accordance with the various exemplary embodiments of this invention.

It is to be understood that the exemplary embodiments described herein are merely exemplary, and that other quadband antenna structures may be readily envisioned by one of ordinary skill in the art based on the teachings herein.

Furthermore, the exemplary quadband antenna described herein may be implemented using multi-layered printed circuit boards. For instance, a printed circuit board comprising a planar substrate with thin metallic layers on opposite sides of the substrate may be used for constructing a quadband antenna according to the invention. In such cases, a connecting via may be formed through the substrate to connect the various antenna elements. With printed circuit board implementations, the exemplary antenna dimensions and tuning parameters would be modified to account for the dielectric constant of the substrate.

Although illustrative embodiments have been described herein with reference to the accompanying drawings, it is to be understood that the present invention is not limited to those precise embodiments, and that various other changes and modifications may be affected therein by one skilled in the art without departing from the scope of the invention.

What is claimed is:

1. A quadband antenna, comprising: a substrate having a front side and a back side; a first radiating element provided on the front side and the back side of the substrate; a second radiating element provided on the front side of the substrate; and a third radiating element provided on the back side of the substrate, and wherein the first radiating element is an F-shaped metal piece.

2. A quadband antenna, comprising: a substrate having a front side and a back side; a first radiating element provided on the front side and the back side of the substrate; a second radiating element provided on the front side of the substrate; and a third radiating element provided on the back side of the substrate, wherein the second radiating element or third radiating element, or both, are a variation of an L-shaped metal piece.

3. A quadband antenna, comprising: a substrate having a front side and a back side; a first radiating element provided on the front side and the back side of the substrate; a second radiating element provided on the front side of the substrate; and a third radiating element provided on the back side of the substrate, and wherein the second radiating element and the third radiating element are provided inside the first radiating element.

4. A quadband antenna, comprising: a substrate having a front side and a back side; a first radiating element provided on the front side and the back side of the substrate; a second radiating element provided on the front side of the substrate; and a third radiating element provided on the back side of the substrate, and wherein the first radiating element has a resonant frequency in a first frequency band of operation, the second radiating element has a resonant frequency in a second frequency band of operation, and the third radiating element has a resonant frequency in a third frequency band of operation.

5. The quadband antenna of claim 4, wherein the second frequency and the third frequency are each greater than the first frequency.

6. The quadband antenna of claim 5, wherein the first radiating element covers 800 MHz and 900 MHz bands.

7. The quadband antenna of claim 5, wherein the second radiating element and the third radiating element produce two resonants in 1800 MHz and 1900 MHz bands.

8. The quadband antenna of claim 5, wherein dimensions of the first radiating element, second radiating element and third radiating element are adjusted to respectively determine the first resonant frequency, the second resonant frequency and the third resonant frequency.

9. The quadband antenna of claim 5, wherein dimensions of the first radiating element, second radiating element and third radiating element are adjusted to perform impendance matching.

10. The quadband antenna of claim 5, wherein dimensions of the first radiating element, second radiating element and third radiating element are adjusted for bandwidth optimization.

11. The quadband antenna of claim 5, wherein the quadband antenna provides dual-band operation.

12. A quadband antenna, comprising: a substrate having a front side and a back side; a first radiating element provided on the front side and the back side of the substrate; a second radiating element provided on the front side of the substrate; and a third radiating element provided on the back side of the substrate, and wherein the first radiating element, the second radiating element and the third radiating element are grounded.

13. The quadband antenna of claim 12, further comprising a frontside ground element and a backside ground element, wherein the frontside ground element and the backside ground element are connected through the substrate.

14. The wireless device of claim 13, wherein the quadband antenna provides wireless wide area network quadband coverage for world wide applications.

15. A quadband antenna, comprising: a substrate having a front side and a back side; a first radiating element provided on the front side and the back side of the substrate; a second radiating element provided on the front side of the substrate; and a third radiating element provided on the back side of the substrate, wherein the antenna is a portable device having the quadband antenna integrally formed on a display unit of the portable device.

16. The portable device of claim 15, wherein the portable device comprises one of a portable laptop computer and a cellular phone.

17. The portable device of claim 15, further comprising a display frame and metal display supporters, wherein at least one of the display frame and the metal display supporters are used as part of the quadband antenna.

18. The portable device of claim 17, wherein the at least one of the display frame and the metal display supporters provide a ground plane.

* * * * *